Patented Apr. 12, 1949

2,467,215

UNITED STATES PATENT OFFICE 2,467,215

DEHUMIDIFICATION OF FLUIDS

William S. W. McCarter, Bala-Cynwyd, Pa., assignor to Attapulgus Clay Company, Philadelphia, Pa., a corporation of Delaware No Drawing. Application July 22, 1943, Serial No. 495,959

4 Claims. (Cl. 210—42.5)

The present invention relates to the preparation and use of improved dehumidifying or dehydrating agents, and particularly synthetic silicates of the metals such as magnesium, calcium, and aluminum, or mixtures thereof.

Fluids such as gases, vapors, or liquids may be freed of moisture by contacting them with substances which absorb water, but which remain inert to the fluid. Many materials have been suggested as dehumidifying agents, but the industrially useful ones are few and expensive. For example, adsorbents which have been used commercially as dehumidifying agents include silica gel, activated alumina, and activated carbon.

Other mineral adsorbents, i. e., natural clays comprising mixed silicates, have been proposed as desiccants. Clays such as fuller's earth and bentonite, even when activated under the most favorable conditions have been found to be markedly inferior to the agents of the present invention for dehumidifying purposes. In many industrial operations it is essential that very dry gas be used, and to produce such a dry gas it is necessary that the drying agent remove all, or substantially all, of the moisture from the gas. The drying of ordinary adsorbent clays to remove free moisture produces materials which will remove gross amounts of moisture from gases passed through such materials, but enough water may remain in the effluent gases to render them unfit for certain uses. Thermal treatment of the clays at temperatures up to about 220° F. results in the removal of all free moisture and improves the drying characteristics of the clays, but fails to produce dehumidifying agents capable of removing substantially all moisture from a gas. The moisture adsorptive properties of the clays may be further improved by heating at temperatures substantially above 220° F., for example, 250° F. to 700° F. under such conditions as to remove all of the free moisture and a portion of the combined water, but even clays activated in this manner are less efficient as dehumidifying agents than the synthetic silicates of the present invention.

I have found that superior dehumidifying agents comprising synthetic silicates of metals may be prepared by reacting in aqueous solution an alkali metal silicate and a salt of a metal capable of forming a water-insoluble silicate. While I prefer to utilize the silicates of magnesium, calcium, or aluminum, adsorptive silicates of other metals such as barium, beryllium, and zirconium may also be employed. The insoluble silicate produced by the above reaction is thoroughly washed with water to remove soluble salts, and is thereafter dried and activated by heating at temperatures between 220° F. and 600° F.

In accordance with my invention, an alkali metal silicate is dispersed in sufficient water to dissolve the compound, and this solution is added to a second solution containing a water-soluble salt of a metal capable of forming a water-insoluble silicate. While chemically equivalent amounts of alkali metal silicate and water-soluble metal salt may be employed, I prefer to have present in the reaction mixture, an excess of metal salt over that required for complete reaction with the alkali metal silicate. The mixture is then heated, preferably at its boiling point, for a period of time sufficient to complete the reaction, whereby there is produced a water-insoluble product comprising the metal silicate. Silicates having a ratio of metal oxide to $SiO_2$ within the range of 1:1 to 1:4 may be produced. The insoluble silicate is then separated from the reaction mixture by suitable means, for example, by decantation, filtering, or centrifuging, and the product may then be washed free of soluble salts, dried to a suitable volatile matter content, and reduced to particles of desired size.

In carrying out my process, I may employ commercially available alkali metal silicates having a ratio of $Na_2O:SiO_2$ or $K_2O:SiO_2$ of 1:1 to 1:4. The silicates may be used in aqueous solution of desired concentration, and the ratio of $Na_2O:SiO_2$ or $K_2O:SiO_2$ may be adjusted by the addition of suitable quantities of NaOH or KOH. Commercial sodium silicate, such as "N" brand silicate having a ratio of $Na_2O:SiO_2$ of 1:3.22, and a Baumé gravity of 41°, has been found satisfactory for use. Alkali metal silicates produced by the treatment of silica or other highly silicious minerals with alkali metal hydroxides, oxides, peroxides, or carbonates, may also be used. For example, materials containing alkali metal silicates produced by fusing fuller's earth, bentonite, or other naturally occurring silicates, with an alkali metal carbonate, or by treating such naturally occurring silicates with an alkali metal hydroxide solution at elevated temperatures, may be satisfactorily employed. Insofar as the water-soluble metal salts are concerned, I prefer to use the chloride or the sulfate, although other soluble salts may be employed. While satisfactory results may be obtained using chemically equivalent amounts of a soluble metal salt, based upon the alkali content of the alkali metal silicate employed, it is not necessary to do so in all cases, as the completion of the reaction may be favored by having present an excess of the metal salt. The concentrations of the solutions employed may vary over a wide range, for example, from 1% up to saturation at the boiling point of the solution or mixture of solutions. The temperature at which the reaction is carried out is preferably that which is necessary to maintain the solution or mixture of reactants at its boiling point, however, higher or lower temperatures may be utilized. In general, temperatures of from 150° F. to 400° F. are suitable, sufficient pressure being maintained upon the reaction mixture to prevent substaintial loss of water therefrom. The reaction time will vary considerably, depending upon the quantities and concentrations of the reactants, the degree of agitation of the reaction mixture and the temperature at which the reaction is carried out. In some cases the formation of the metal silicate may be completed in a few hours, whereas in other cases the reaction may require 10 to 15 hours or more. The metal silicate, upon completion of the reaction, may be freed of soluble salts by washing with water, and then dried to a suitable volatile matter content (water content) prior to reduction of the silicate to desired particle size. The drying and thermal activation of the silicate is accomplished by heating at a temperature from 220° F. to 600° F., and preferably from 275° F. to 400° F. Depending upon the method of applying the metal silicate in the dehumidification of fluids, the particle size will vary. The particle size of the silicate may be of the order of 4–8 mesh or 10–20 mesh when the fluid to be dehydrated is to be passed through a bed of the silicate. A finer mesh size may be utilized when the fluid to be dehydrated is intimately mixed with the silicate, and the silicate thereafter removed by filtration or other means. The volatile matter content of the silicate may range from 5% to 12% by weight, and is preferably of the order of 7% to 11%.

The various brands of sodium silicate which are exemplary of those which may be used in accordance with this invention are given in the following table.

| Brand | Ratio Na$_2$O:SiO$_2$ | Na$_2$O | SiO$_2$ | H$_2$O | Baumé Gravity |
|---|---|---|---|---|---|
| | | Percent | Percent | Percent | Degrees |
| Na metasilicate | 1:1 | 29.1 | 28.2 | 42.7 | solid |
| "C" brand | 1:2 | 18.0 | 36.0 | 46.0 | 59.3 |
| "N" brand | 1:3.22 | 8.9 | 28.7 | 62.4 | 41.0 |
| "S" brand | 1:3.9 | 6.3 | 24.6 | 69.1 | 33.5 |

My invention may be further illustrated by the following examples, which, however, are not to be construed as limiting the scope thereof:

1. 237 parts by weight of MgCl$_2$.6H$_2$O was dissolved in 3000 parts by weight of water and the resulting solution was introduced into a reaction vessel provided with a stirrer. A second solution was made up consisting of 340 parts by weight of "C" brand sodium silicate (Na$_2$O.2SiO$_2$) and 1500 parts by weight of water and this solution was added to the solution first mentioned with vigorous stirring. The quantity of MgCl$_2$.6H$_2$O employed was slightly in excess of that required for complete reaction with the sodium silicate. The mixture was refluxed for 2 hours at its boiling point and the resulting water-insoluble magnesium silicate was then filtered from the reaction mixture, and washed free of soluble salts with water. The filter cake was broken up, air-dried and screened to 10–30 mesh.

The granular magnesium silicate was then activated by heating at various temperatures to obtain samples having different volatile matter contents, and the samples were tested to determine their dehumidifying characteristics. The dry air capacity (D. A. C.) was determined by passing a measured volume of air of known and constant humidity through the known weight of sample contained in an adsorption tower at constant temperature (75% humidity at 80° F.). The effluent air from the adsorption tower was passed through a moisture-detection tube containing magnesium perchlorate, and the adsorption tower and contents, as well as the detection tube, were weighed periodically to determine the amount of moisture adsorbed and the time at which moisture was first detectable in the effluent air from the adsorption tower. The dry air capacity of the samples represents the per cent water adsorbed, based on the original weight of the sample before any water appears in the effluent air. The equilibrium capacity (E. C.) represents the per cent water adsorbed when the moisture content of the air introduced into and withdrawn from the adsorption tower is the same. The per cent volatile matter (V. M.) is the total volatile matter driven off by heating the sample at 1800° F. to constant weight. The results obtained are shown in the following table:

| Activating Conditions | | Dehumidifying Adsorbent Efficiency | | |
|---|---|---|---|---|
| Temp., °F. | Heating time, hours | Percent V. M. | D. A. C. | E. C. |
| 220 | 24 | 11.05 | 21.8 | 26.3 |
| 300 | 5 | 10.75 | 22.8 | 28.5 |
| 350 | 3 | 8.82 | 24.4 | 33.7 |
| 400 | 4 | 8.67 | 24.1 | 32.4 |
| 500 | 5 | 7.22 | 19.2 | 28.3 |

2. The process of Example 1 was repeated, with the exception that 212 parts by weight of MgCl$_2$.6H$_2$O was reacted with 390 parts by weight of "C" brand sodium silicate, the sodium silicate being slightly in excess of that required to react with the MgCl$_2$.6H$_2$O. The dehumidification efficiency of the resulting product is shown in the following table.

| Activating Conditions | | Dehumidifying Adsorbent Efficiency | | |
|---|---|---|---|---|
| Temp., °F. | Heating Time, Hours | Per Cent V. M. | D. A. C. | E. C. |
| 220 | 24 | 11.85 | 20.5 | 24.0 |
| 350 | 3 | 9.55 | 21.5 | 29.0 |
| 500 | 5 | 6.85 | 17.4 | 29.5 |

3. The process of Example 1 was repeated using various brands of sodium silicate with MgCl$_2$.6H$_2$O, the latter being slightly in excess of the quantity required for complete reaction with the sodium silicate. The resulting granular products were activated by heating at 350° F. for 3 hours, and then tested for their dehumidification efficiencies, with the following results:

| Brand of Na Silicate | Ratio MgO to SiO₂ in product | Dehumidifying Efficiency | | |
|---|---|---|---|---|
| | | Per Cent V. M. | D. A. C. | E. C. |
| Na Metasilicate | MgO.SiO₂ | 9.66 | 25.7 | 29.8 |
| "C" Brand | MgO.2SiO₂ | 8.82 | 24.4 | 33.7 |
| "N" Brand | MgO.3.22SiO₂ | 6.17 | 23.1 | 35.1 |
| "S" Brand | MgO.3.9SiO₂ | 6.08 | 21.0 | 36.4 |

4. 130 parts by weight of CaCl₂ was dissolved in 3000 parts by weight of water and the resulting solution was introduced into a reaction vessel provided with a stirrer. A second solution was made up consisting of 344 parts by weight of "C" brand sodium silicate and 1500 parts by weight of water, and this solution was added to the solution first mentioned with vigorous stirring. The mixture was refluxed for 2 hours at its boiling point, and the water-insoluble calcium silicate resulting from the reaction was filtered from the mixture and washed with water to remove soluble salts. The filter cake was broken up, air-dried and screened to 10–30 mesh. The resulting granular calcium silicate was then activated by heating and the product then tested for dehumidifying efficiency, with the following results:

| Activating Conditions | | Dehumidifying Adsorbent Efficiency | | |
|---|---|---|---|---|
| Temp., °F. | Heating Time, Hours | Percent V. M. | D. A. C. | E. C. |
| 350 | 3 | 8.03 | 19.6 | 25.8 |

5. The process of Example 4 was repeated using 133 parts by weight of Al₂(SO₄)₃. The dehumidifying efficiency of the granular aluminum silicate thus produced was determined and the results are shown in the following table:

| Activating Conditions | | Dehumidifying Adsorbent Efficiency | | |
|---|---|---|---|---|
| Temp., °F. | Heating Time, Hours | Percent V. M. | D. A. C. | E. C. |
| 350 | 3 | 6.15 | 22.1 | 27.1 |

While herein I have described my invention with particular reference to the production of synthetic silicates by the reaction in aqueous solution of an alkali metal silicate with the salt of a metal capable of forming a water-insoluble metal silicate, such silicates may be satisfactorily produced by other methods of synthesis. For example, a basic carbonate of a metal, such as magnesium basic carbonate, may be treated with silica, water, and alkali at an elevated temperature and pressure to produce a magnesium silicate. Or, an alkali metal silicate may be reacted with a water-soluble metal salt, for example, a calcium salt, and the resulting insoluble calcium silicate then transposed into a magnesium silicate by treatment with a water-soluble magnesium salt at elevated temperature. Finally, any or all of the water-insoluble metal silicates to be employed in accordance with this invention may be subjected to activation by treatment with an ammonium salt in aqueous solution, prior to thermal treatment. The formation of water-insoluble metal silicates by the reaction of an alkali metal silicate with a water-soluble metal salt in the presence of an ammonium salt such as ammonium chloride, sulfate, or nitrate, has also been found to yield adsorbents of improved dehumidifying efficiency.

The activated metal silicate adsorbents prepared in accordance with my invention may be employed to partially or completely dehumidify a variety of fluids including gases such as air, oxygen, hydrogen, nitrogen, and hydrocarbon gases such as methane, ethane, propane, butane, isobutane, and the corresponding olefin gases or mixtures comprising any two or more of such gases. A variety of other compounds may likewise be dehumidified or dehydrated including hydrocarbon oils or distillates, benzene, toluene, xylene, halogenated hydrocarbons, alcohols, esters, ethers, ketones, and the like.

At such time as the dehumidifying efficiency of the metal silicate adsorbent decreases through moisture adsorption to an extent such that the effluent gas contains more than a tolerable amount of moisture, the adsorbent properties thereof may be regenerated by heating at temperatures of the order of 220° F. to 600° F., and preferably at 220° F. to 400° F. Such regeneration may be carried out at ordinary or reduced pressure, and in the presence or absence of air or other gas introduced from an extraneous source.

I claim:
1. The method of dehumidifying fluids, which comprises intimately contacting a fluid containing moisture with a water-insoluble metal silicate at a temperature conducive to the adsorption of said moisture by said silicate, said silicate being prepared by reacting in aqueous solution an alkali metal silicate and a water-soluble salt of a metal capable of forming a water-insoluble silicate, separating the insoluble silicate from said solution, washing said silicate to remove soluble salts, and heating the washed silicate at a temperature between 220° F. and 600° F.

2. The method of dehumidifying fluids, which comprises intimately contacting a fluid containing moisture with magnesium silicate at a temperature conducive to the adsorption of said moisture by said silicate, said silicate being prepared by reacting in aqueous solution sodium silicate and a water-soluble salt of magnesium, separating the magnesium silicate from said solution, washing said silicate to remove soluble salts, and heating the washed silicate at a temperature between 275° F. and 400° F.

3. The method of dehumidifying fluids, which comprises intimately contacting a fluid containing moisture with calcium silicate prepared by reacting in aqueous solution sodium silicate and a water-soluble salt of calcium, separating the calcium silicate from said solution, washing said silicate to remove soluble salts, and heating the washed silicate at a temperature between 275° F. and 400° F.

4. The method of dehumidifying fluids, which comprises intimately contacting a fluid containing moisture with aluminum silicate prepared by reacting in aqueous solution sodium silicate and a water-soluble salt of aluminum, separating the aluminum silicate from said solution, washing said silicate to remove soluble salts, and heating the washed silicate at a temperature between 275° F. and 400° F.

WILLIAM S. W. McCARTER.

REFERENCES CITED

The following references are of record in the file of this patent:

UNITED STATES PATENTS

| Number | Name | Date |
|---|---|---|
| 242,171 | Ofenheim et al. | May 31, 1881 |
| 345,174 | Porter | July 6, 1886 |
| 1,133,446 | Richter | Mar. 30, 1915 |
| 1,198,039 | Krause | Sept. 12, 1916 |
| 1,682,588 | Wietzel | Aug. 28, 1928 |
| 1,686,558 | Hall | Oct. 9, 1928 |
| 1,745,952 | Prutzman | Feb. 4, 1930 |
| 1,832,153 | Stowener | Nov. 17, 1931 |
| 1,939,860 | Montgomery | Dec. 19, 1933 |
| 1,959,346 | Cummins | May 22, 1934 |
| 2,090,741 | Zublin | Aug. 24, 1937 |
| 2,107,215 | Rembert | Feb. 1, 1938 |
| 2,163,527 | Caldwell | June 20, 1939 |
| 2,359,343 | Winding | Oct. 3, 1944 |
| 2,388,616 | LaLande | Nov. 6, 1945 |

OTHER REFERENCES

Merck's Index, published in 1930 by Merck & Co. Inc., Rahway, N. J., a copy of which may be found in Div. 49. Page 312, lines 6 to 17, second column cited.